US011072435B2

(12) United States Patent
Mccage et al.

(10) Patent No.: US 11,072,435 B2
(45) Date of Patent: Jul. 27, 2021

(54) INLET FLOW STRUCTURE FOR TURBOPROP ENGINE

(71) Applicant: HONEYWELL INTERNATIONAL INC., Morris Plains, NJ (US)

(72) Inventors: Raymond Mccage, Chandler, AZ (US); Derek Anthony Rice, Phoenix, AZ (US); Joseph Becar, Gilbert, AZ (US); Yates Wong, Humboldt, AZ (US); Brian Jardine, Scottsdale, AZ (US); Bruce Dan Bouldin, Phoenix, AZ (US); Kevin Sing, Mesa, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 243 days.

(21) Appl. No.: 16/170,941

(22) Filed: Oct. 25, 2018

(65) Prior Publication Data

US 2020/0130857 A1 Apr. 30, 2020

(51) Int. Cl.
| | |
|---|---|
| *B64D 33/02* | (2006.01) |
| *B64D 27/10* | (2006.01) |
| *F02C 7/04* | (2006.01) |
| *B64D 35/02* | (2006.01) |

(52) U.S. Cl.
CPC ............. *B64D 33/02* (2013.01); *B64D 27/10* (2013.01); *B64D 35/02* (2013.01); *B64D 2033/0293* (2013.01); *F02C 7/04* (2013.01); *F05D 2220/323* (2013.01); *F05D 2250/51* (2013.01)

(58) Field of Classification Search
CPC .... B64D 2033/0233; B64D 2033/0293; B64D 2033/0206; B64D 29/00–08; B64D 33/02–028; B64D 15/00; B64D 15/02; B64D 35/00; F02C 7/04; F02C 7/047;
(Continued)

(56) References Cited

U.S. PATENT DOCUMENTS

| | | | | |
|---|---|---|---|---|
| 4,456,458 A | * | 6/1984 | Gilbertson ............. | B01D 45/04 244/53 B |
| 5,961,067 A | * | 10/1999 | Hall ....................... | B64D 33/02 244/1 N |
| 6,817,572 B2 | | 11/2004 | Negulescu et al. | |

(Continued)

FOREIGN PATENT DOCUMENTS

| | | |
|---|---|---|
| FR | 998179 A | 1/1952 |
| FR | 3039209 A1 | 1/2017 |
| GB | 1527646 A | 10/1978 |

*Primary Examiner* — Steven M Sutherland
*Assistant Examiner* — Rodolphe Andre Chabreyrie
(74) *Attorney, Agent, or Firm* — Lorenz & Kopf, LLP

(57) ABSTRACT

A turboprop engine system for an aircraft includes an engine, a propeller, and a gear train coupled to and configured to provide power from the engine to the propeller at a predetermined gear reduction. The engine system also includes a gearbox that houses at least part of the gear train. The gearbox includes a gearbox flow structure and an inlet flow structure that is removably attached to the gearbox. The inlet flow structure and the gearbox flow structure cooperate to define an inlet flow passage to the engine. The inlet flow passage has an upstream end and a downstream end that are cooperatively defined by the inlet flow structure and the gearbox flow structure. The upstream end is configured to receive an airstream that is directed along the inlet flow passage to the downstream end and toward the engine.

19 Claims, 8 Drawing Sheets

(58) Field of Classification Search
CPC .. F02C 7/045; F02C 7/36; F01D 25/02; F01D 25/24; F01D 25/243
See application file for complete search history.

(56) References Cited

U.S. PATENT DOCUMENTS

| | | |
|---|---|---|
| 6,990,798 B2 | 1/2006 | Bouchard et al. |
| 8,844,258 B2 | 9/2014 | Ekanayake et al. |
| 9,057,329 B2 | 6/2015 | Weir et al. |
| 2003/0115885 A1 | 6/2003 | MacFarlane et al. |
| 2004/0238687 A1* | 12/2004 | Jones ................ F02K 1/64 244/62 |
| 2009/0194633 A1* | 8/2009 | De Souza ............ B64D 33/10 244/54 |
| 2016/0237898 A1* | 8/2016 | Poisson ............... F02C 7/045 |
| 2017/0008633 A1 | 1/2017 | Parmentier et al. |
| 2017/0241342 A1 | 8/2017 | Gekht et al. |
| 2018/0142626 A1* | 5/2018 | Joudareff ............. F02C 9/18 |

* cited by examiner

INLET FLOW STRUCTURE FOR TURBOPROP ENGINE

STATEMENT REGARDING FEDERALLY SPONSORED RESEARCH OR DEVELOPMENT

This invention was made with Government support under FA8650-15-D-2504 awarded by the Air Force Research Laboratory (AFRL). The Government has certain rights in the invention.

TECHNICAL FIELD

The present disclosure generally relates to a turboprop engine and, more particularly, relates to an inlet flow structure for a turboprop engine.

BACKGROUND

Some gas turbine engines are used to provide power to another component. As an example, a turboprop engine may receive and compress intake air. Fuel may be added to the compressed air, and the fuel-air mixture may combust. The hot combustion gases may expand through a turbine section of the turboprop engine. At least some of the generated power may be transmitted through reduction gearing to a propeller.

The turboprop engine may include a duct or other inlet structure that provides an intake airstream to the compressor section of the engine. However, the inlet structure may suffer from certain deficiencies. For example, thermal expansion during de-icing procedures may cause the inlet structure to impart stress on certain components of the engine, such as the compressor shroud. This may negatively affect engine performance Additionally, conventional inlet structures may be difficult to manufacture, assemble, etc. Furthermore, in some cases, maintenance and repair may be impeded due to the construction of these inlet structures.

Thus, there is a need for an improved inlet structure of a turboprop engine system that provides an airstream to a turboprop engine. There is also a need for an inlet structure that allows for thermal expansion without detrimentally affecting other components of the turboprop engine. There is also a need for an inlet structure that is highly manufacturable, convenient to assemble, etc. Furthermore, other desirable features and characteristics of the present disclosure will become apparent from the subsequent detailed description and the appended claims, taken in conjunction with the accompanying drawings and the foregoing technical field and background.

BRIEF SUMMARY

In one embodiment, a turboprop engine system for an aircraft is disclosed that includes an engine, a propeller, and a gear train coupled to and configured to provide power from the engine to the propeller at a predetermined gear reduction. The engine system also includes a gearbox that houses at least part of the gear train. The gearbox includes a gearbox flow structure and an inlet flow structure that is removably attached to the gearbox. The inlet flow structure and the gearbox flow structure cooperate to define an inlet flow passage to the engine. The inlet flow passage has an upstream end and a downstream end that are cooperatively defined by the inlet flow structure and the gearbox flow structure. The upstream end is configured to receive an airstream that is directed along the inlet flow passage to the downstream end and toward the engine.

In another embodiment, a method of manufacturing a turboprop engine system is disclosed. The method includes removably attaching an inlet flow structure to a gearbox. The gearbox is configured to house at least part of a gear train that provides power from an engine to a propeller at a predetermined gear reduction. The gearbox includes a gearbox flow structure. The inlet flow structure and the gearbox flow structure, when removably attached, cooperate to define an inlet flow passage to the engine. The inlet flow passage has an upstream end and a downstream end that are cooperatively defined by the inlet flow structure and the gearbox flow structure. The upstream end is configured to receive an airstream that is directed along the inlet flow passage to the downstream end and toward the engine.

In yet another embodiment, a turboprop engine system for an aircraft is disclosed. The engine system includes an engine with a compressor shroud, a propeller, and a gear train coupled to and configured to provide power from the engine to the propeller at a predetermined gear reduction. The engine system further includes a gearbox that houses at least part of the gear train. The gearbox includes a gearbox flow structure and an inlet flow structure that is removably attached to the gearbox to cooperatively define an intake system with an inlet flow passage to the engine. The inlet flow passage has an upstream end and a downstream end that are cooperatively defined by the inlet flow structure and the gearbox flow structure. The upstream end is configured to receive an airstream that is directed along the inlet flow passage to the downstream end and toward the engine. The inlet flow structure and the gearbox are removably attached at a first joint that is a fixed joint. The inlet flow structure and the gearbox removably attach at a second joint that is a moveable joint. Also, the intake system is attached to the compressor shroud proximate the downstream end at a third joint. The third joint is a moveable joint.

Furthermore, other desirable features and characteristics of the engine system will become apparent from the above background, the subsequent detailed description, and the appended claims, taken in conjunction with the accompanying drawings.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a gas turbine engine system, such as a turboprop engine system, with improved characteristics. In particular, example embodiments include an air intake system that is cooperatively defined by a gearbox and an inlet flow structure. Together, the gearbox and the inlet flow structure may cooperatively define an upstream end and a downstream end of an inlet flow passage extending through the air intake system to the engine. The inlet flow structure may include one or more internal channels. The internal channels, in some embodiments, may be configured for receiving a fluid flow, such as a flow of de-icing fluid through the inlet flow structure.

The inlet flow structure may be removably attached to the gearbox and/or other components of the engine system at one or more couplings. There may be fixed couplings that fixedly attach the inlet flow structure to the other structure. There may also be moveable couplings that attach the two structures, but allow predetermined movement between the inlet flow structure and the other structure. Accordingly, the inlet flow structure may be robustly attached and, yet, thermal expansion may be allowed without imparting detrimental stress on the components. Thus, for example, the de-icing process may be performed in an improved manner.

In some embodiments, the upstream end and upstream portions of the inlet flow passage may be arcuate (e.g., substantially U-shaped). Also, in some embodiments, downstream portions and the downstream end of the inlet flow passage may be annular. The inlet flow structure and/or the gearbox may include contoured surfaces that transition between the upstream end to the downstream end. Accordingly, the air intake system may be relatively compact.

Methods of manufacturing the inlet flow structure and other components of the air intake system are disclosed. As discussed, the inlet flow structure is highly manufacturable, convenient to assemble, etc.

Figure 1:
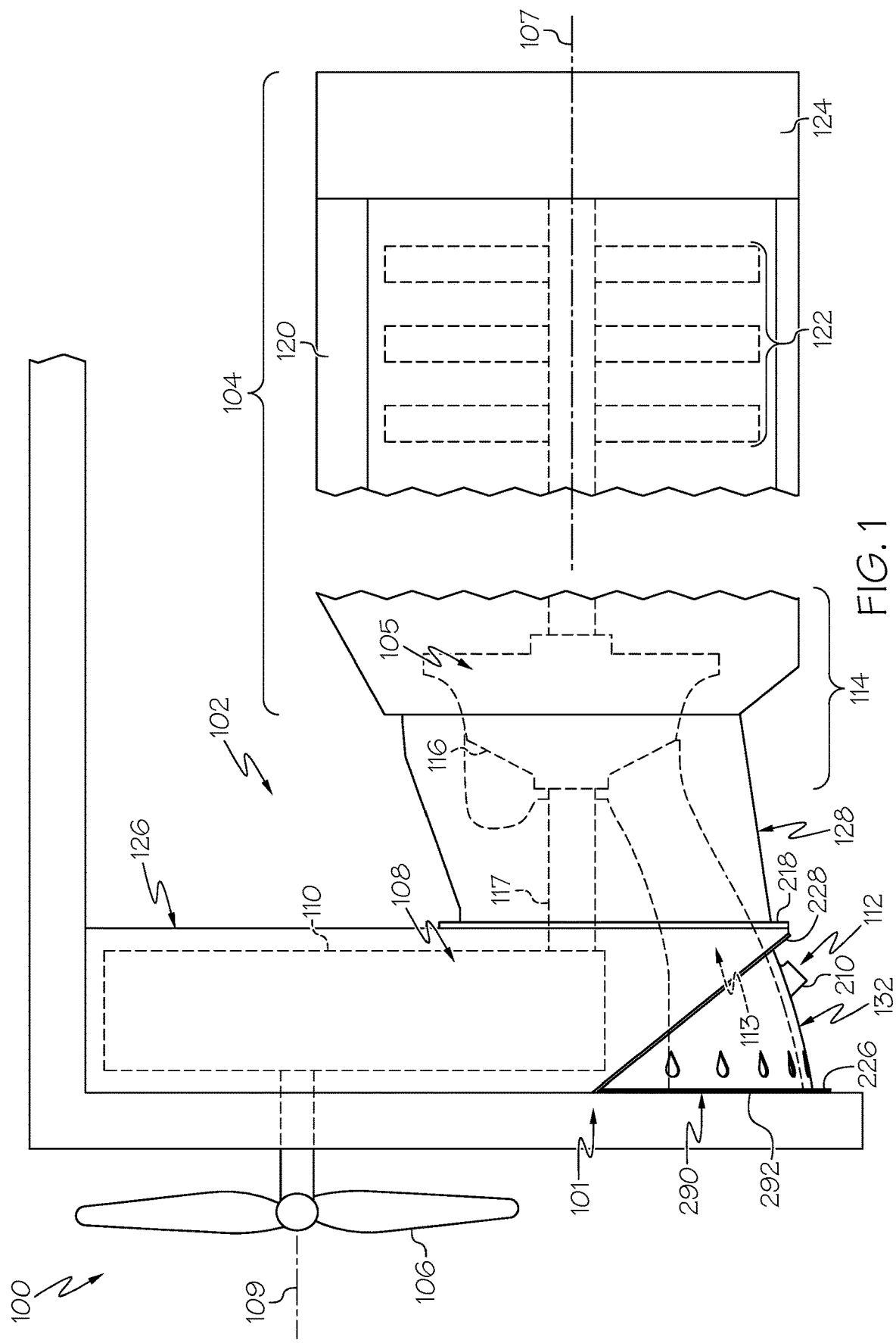
FIG. 1 is a schematic side view of an engine system according to example embodiments of the present disclosure.

Turning now to FIG. 1, a partly schematic diagram of a gas turbine engine 100 is illustrated according to example embodiments of the present disclosure. The gas turbine engine 100 may extend generally along a longitudinal axis 107. The gas turbine engine 100 may be included on a first outer support structure 101 of an aircraft. The first outer support structure 101 may include one or more support beams, struts, frame members, parts of a chassis, and/or other support structures. The engine 100 may extend rearward along the axis 107 from the support structure 101 as shown in FIG. 1.

The gas turbine engine 100 may comprise a turboprop engine system 102 for an aircraft. Those having ordinary skill in the art will understand the gas turbine engine 100 may be of another configuration, such as a turboshaft engine, without departing from the scope of the present disclosure. Also, the engine 100 may be included on a vehicle of any suitable type, such as an aircraft, rotorcraft, marine vessel, train, or other vehicle. In other embodiments, the engine 100 may be included on a stationary object.

Generally, the turboprop engine system 102 may include an engine 104 that receives intake air, compresses the intake air, adds fuel, and combusts the air-fuel mixture to drivingly rotate a rotating group 105. Power from the rotating group 105 may be transferred to a propeller 106 via a powertrain 108. In some embodiments, the powertrain 108 may include a geartrain 110 that transfers power from the rotating group 105 to the propeller 106 at a predetermined gear reduction. The powertrain 108 may also include a gearbox 126 that houses at least part of the geartrain 110.

In some embodiments, the rotating group 105 may be supported for rotation about a first axis 107, and the propeller 106 may be supported for rotation about a second axis 109. The first and second axes 107, 109 may be substantially parallel and spaced apart at a distance in some embodiments. In some embodiments, the axes 107, 109 may be spaced apart in a vertical direction (parallel to the direction of gravity) with the propeller 106 disposed above the engine 104.

Figure 2:
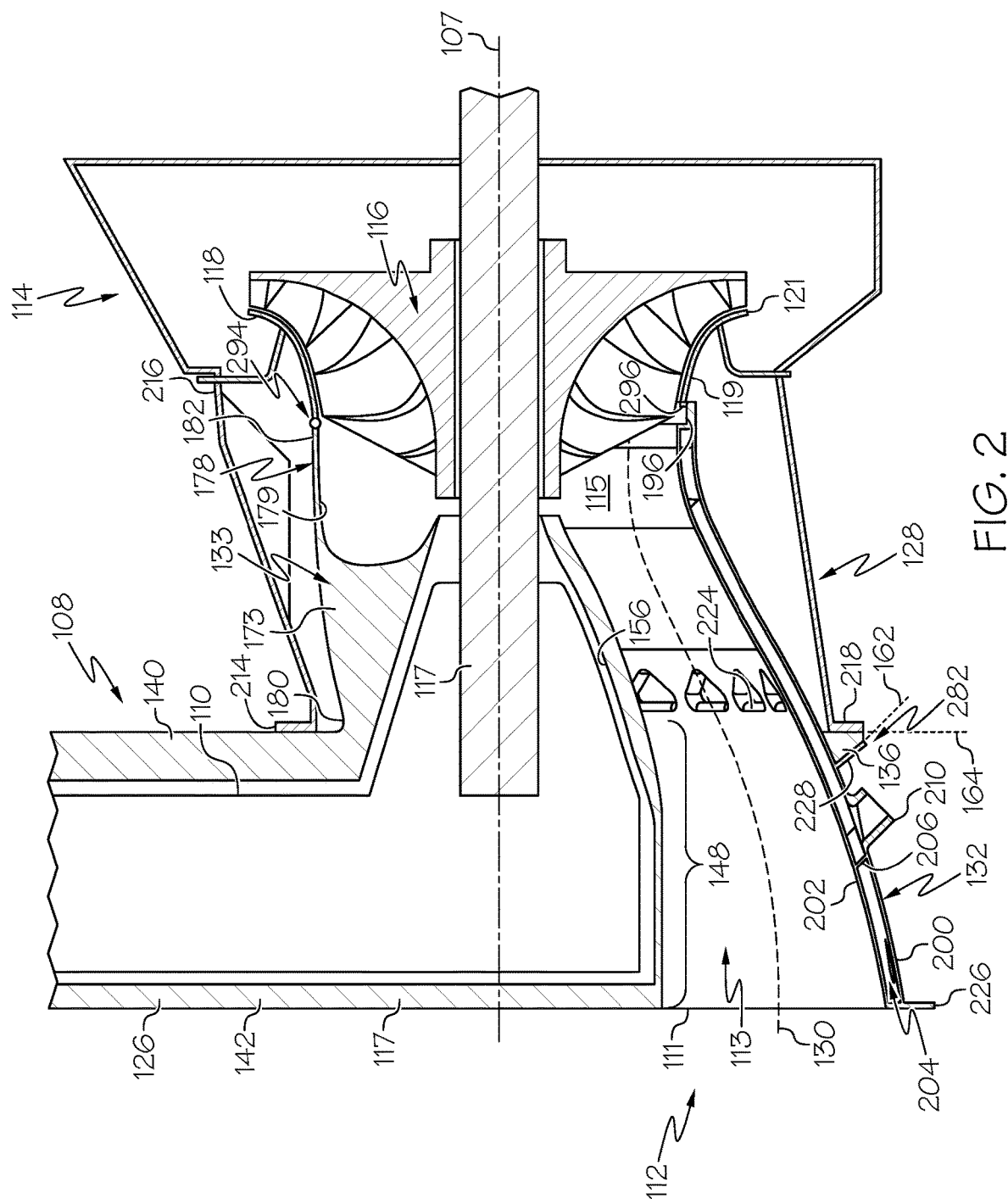
FIG. 2 is a section view of the engine system of FIG. 1.

The engine system 102 may include an air intake system 112. The air intake system 112 may define an inlet flow passage 113 that receives an airstream and directs it toward the engine 104. As shown in FIG. 2, the inlet flow passage 113 may include an upstream end 111 and a downstream end 115, which is proximate the engine 104. The inlet flow passage 113 may extend along a flow axis 130. The flow axis 130 may extend substantially along the axis 107 and may be contoured such that the upstream end 111 is farther away radially from the axis 107 than the downstream end 115.

The air intake system 112 may be cooperatively defined by the gearbox 126 and by an inlet flow structure 132 as will be discussed in detail below. In some embodiments, the gearbox 126 and the inlet flow structure 132 may cooperatively define the upstream end 111, the downstream end 115, and areas of the inlet flow passage 113 therebetween. As shown, the gearbox 126 may define an upper portion of the inlet flow passage 113, and the inlet flow structure 132 may define a lower portion of the inlet flow passage 113. As will be discussed, certain features of the inlet flow structure 132, the gearbox 126 and/or other features of the air intake system 112 may advantageously allow for thermal expansion without imparting undue stress on the engine 104 or other parts of the system 102. Furthermore, the air intake system 112 may be relatively compact because of these features. Additionally, the air intake system 112 may be efficiently manufactured, assembled, replaced, and repaired as will be discussed.

As shown in FIGS. 1 and 2, the engine 104 may include a compressor section 114 configured for compressing the airstream received by the air intake system 112. The compressor section 114 may include an impeller 116 that is supported on a shaft 117 of the rotating group 105. The compressor section 114 may further include a compressor shroud 118 that surrounds the impeller 116. The compressor shroud 118 may be annular and may expand in diameter from an upstream end 119 to a downstream end 121 (FIG. 2). Although not shown, the compressor section 114 may be a multi-stage compressor that includes additional fans, stators, or other components for compressing the airstream.

Referring back to FIG. 1, the engine 104 may further include a combustion section 120. In the combustion section 120, the compressed air is mixed with fuel supplied from a non-illustrated fuel source. The fuel-and-air mixture is combusted in the combustion section 120, and the high-energy combusted air mixture is then directed into a turbine section 122 of the engine 104.

The turbine section 122 may include one or more turbines that are supported by the shaft 117. The combusted mixture from the combustion section 120 may expand through and drive the turbine(s) in rotation, causing rotation of the shaft 117. The combusted air mixture may then exhaust from the engine 104 via an exhaust section 124, which is schematically illustrated in FIG. 1. At least some of the power in the rotating shaft 117 may be transferred via the powertrain 108 to the propeller 106.

As stated, the powertrain 108 may include the gear train 110 with a plurality of gears of various types. The geartrain 110 may be configured to transfer power from the shaft 117 to the propeller 106 at a predetermined gear reduction. As mentioned above, the axis 107 of the shaft 117 and the axis 109 of the propeller 106 may be parallel and spaced apart. Thus, in this embodiment, the geartrain 110 may extend generally radially with respect to the axes 107, 109 to connect the engine 104 and the propeller 106.

The gearbox 126 of the powertrain 108 may be a rigid structure made, for example, from metal. As shown in the embodiments of FIGS. 3-6, the gearbox 126 may include an upper container portion 134 and a hub 133 that cooperatively contain the geartrain 110, a support arm 136 that supports the inlet flow structure 132, and a gearbox flow structure 146 that cooperates with the inlet flow structure 132 to define the air intake system 112. In some embodiments, the container portion 134, the hub 133, the support arm 136, and the gearbox flow structure 146 may be integrally connected to define a unitary, one-piece member. In some embodiments, the container portion 134, the hub 133, the support arm 136, and the gearbox flow structure 146 may be made from a casting (i.e., manufactured via a casting process). In other embodiments, these members may be formed via an additive manufacturing process or other rapid manufacturing method.

Figure 3:
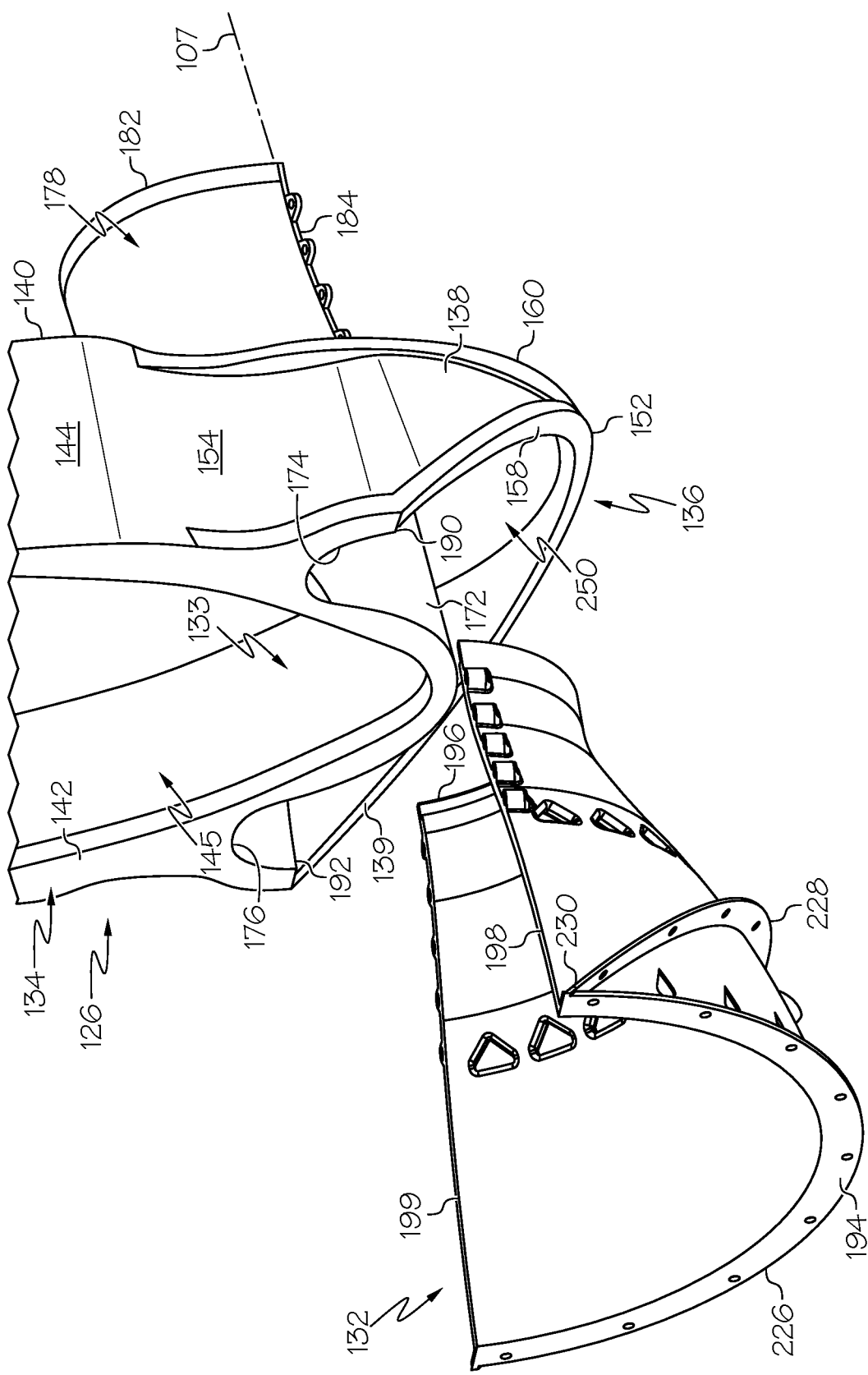
FIG. 3 is an exploded isometric view of an air intake system of the engine system of FIG. 1.
Figure 5:
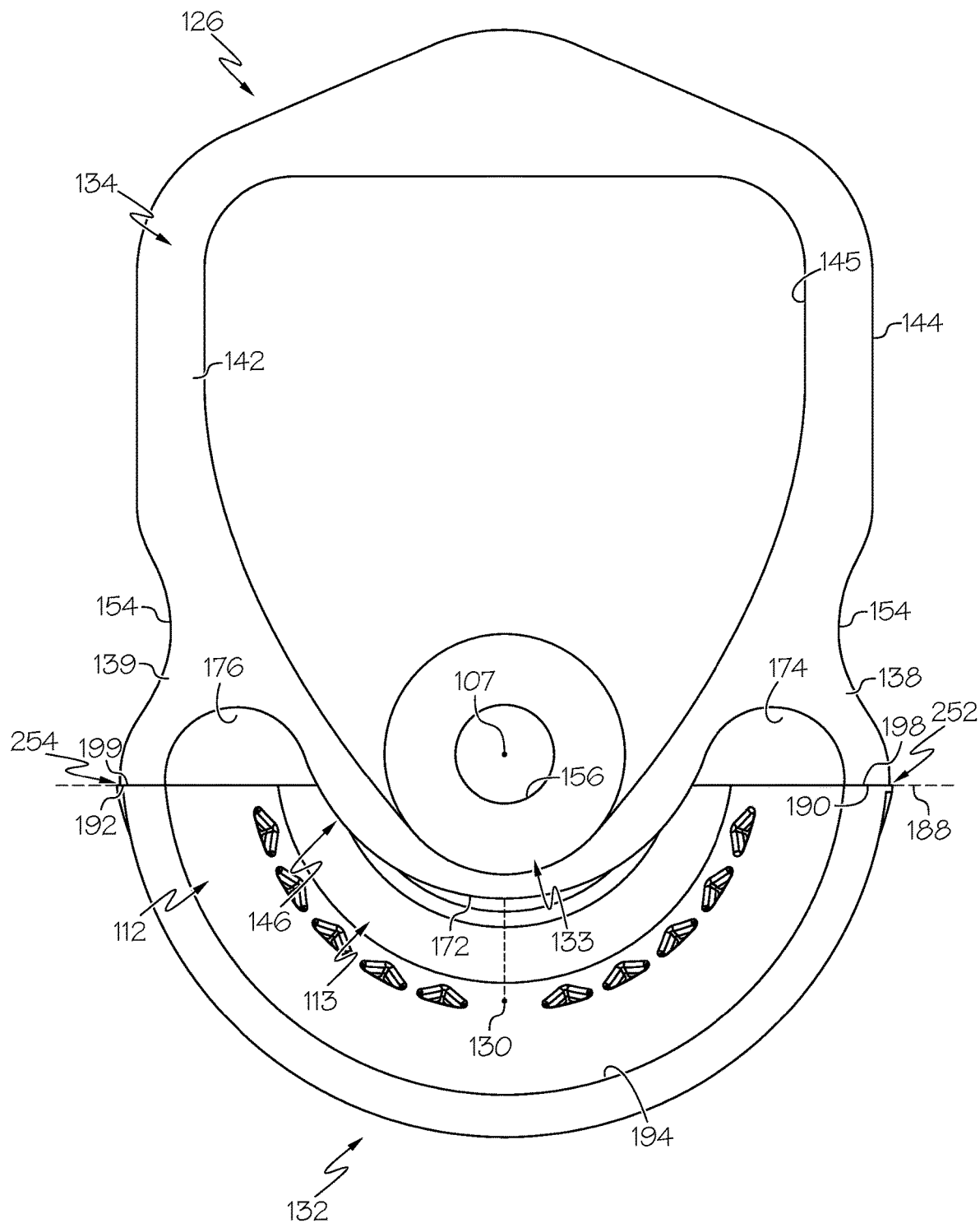
FIG. 5 is an upstream view of the air intake system of FIG. 3.

As shown in FIGS. 2 and 3, the container portion 134 of the gearbox 126 may be substantially box-like and hollow with an aft wall 140, a forward wall 142, and a side wall 144. As shown, the aft wall 140 may be substantially flat and may be arranged substantially normal to the axis 107. The forward wall 142 may be substantially flat and arranged substantially normal to the axis 107. The side wall 144 may extend longitudinally between the aft wall 140 and the forward wall 142 and may span along the periphery of both. Moreover, the side wall 144 may include at least one recess 154 (FIGS. 3, 5, and 6) on the outer surface thereof. The recess(es) 154 may provide weight savings and/or space savings for the gearbox 126. The forward wall 142 may also define a forward opening 145 in the gearbox 126 as shown in FIGS. 3 and 5. In some embodiments, the propeller 106 may extend out the forward opening 145. Also, the forward wall 142 may be attached to the support structure 101 (e.g., the chassis) of the aircraft as shown in FIG. 1.

The hub 133 of the gearbox 126 may be substantially centered on the axis 107. Forward portions of the hub 133 may be arcuate, may extend about the axis 107, and may be connected to the lower portion of the container portion 134 of the gearbox 126. An aft portion of the hub 133 may be tube-shaped (hollow and cylindrical). The hub 133 may be tapered in width (diameter) and may gradually narrow in the rearward direction. Also, the aft portion of the hub 133 may be cantilevered from the container portion 134 of the gearbox 126 so as to extend freely in the aft direction. The hub 133 may have a hollow inner surface 156 that is in communication with the interior of the container portion 134 of the gearbox 126 as shown in FIG. 2. A portion of the shaft 117 and the geartrain 110 may be substantially contained within the hub 133 and the container portion 134.

Figure 4:
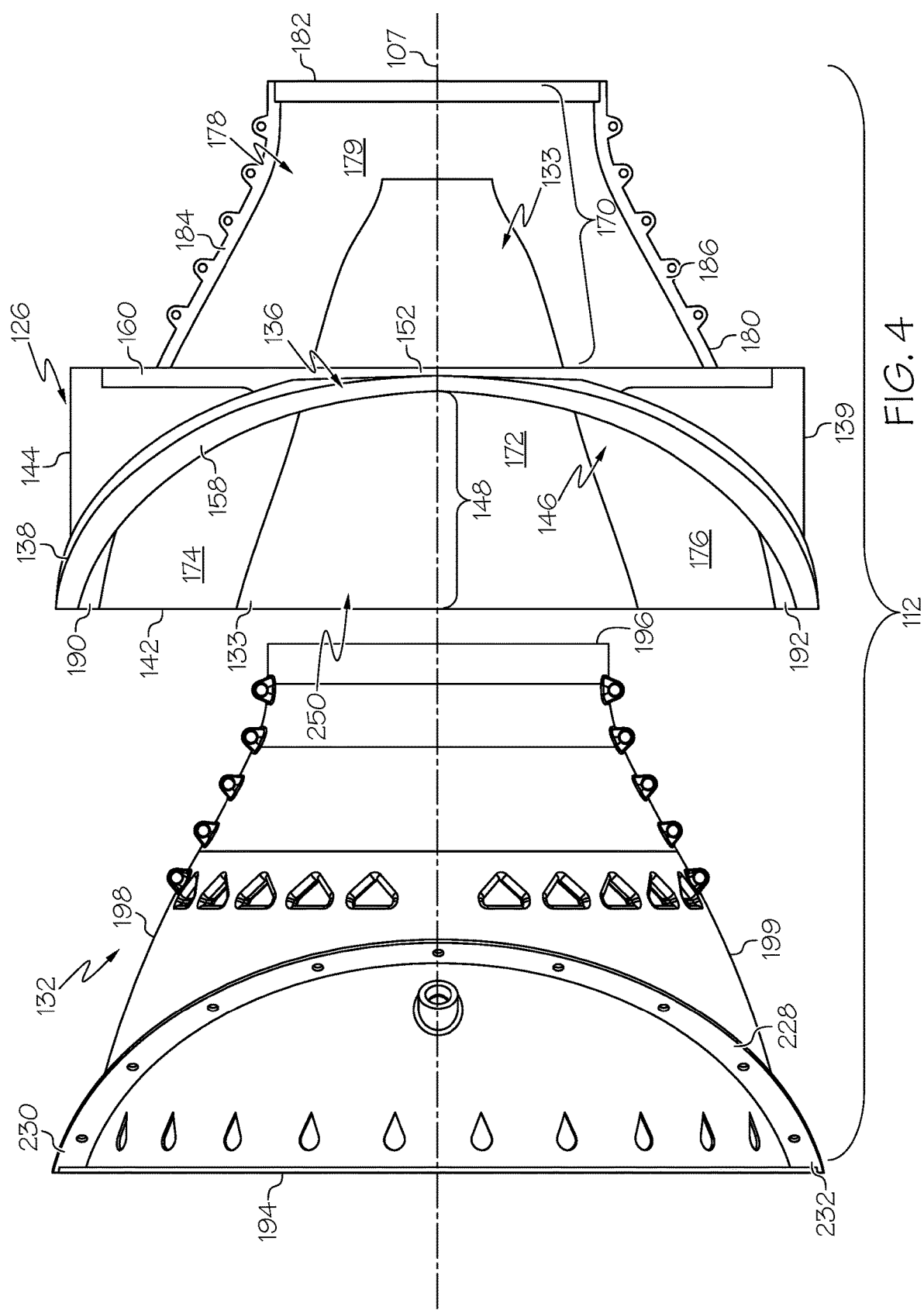
FIG. 4 is an exploded bottom view of the air intake system of FIG. 3.

Additionally, the gearbox flow structure 146 may be at least partially defined by an underside of the gearbox 126. Specifically, the gearbox flow structure 146 may include a forward portion 148 and an aft portion 170 (FIG. 4). The forward portion 148 may include an arcuately contoured and convex underside surface 172 of the hub 133, a first side surface 174, and a second side surface 176. The first and second side surfaces 174, 176 may be concave and contoured and disposed on opposite sides of the hub 133. There may be a smooth and continuous contour in the lateral direction between the first side surface 174, across the underside surface 172 to the second side surface 176 such that the forward portion 148 of the gearbox flow structure 146 has a generally M-shaped contour as shown in FIG. 5.

Figure 6:
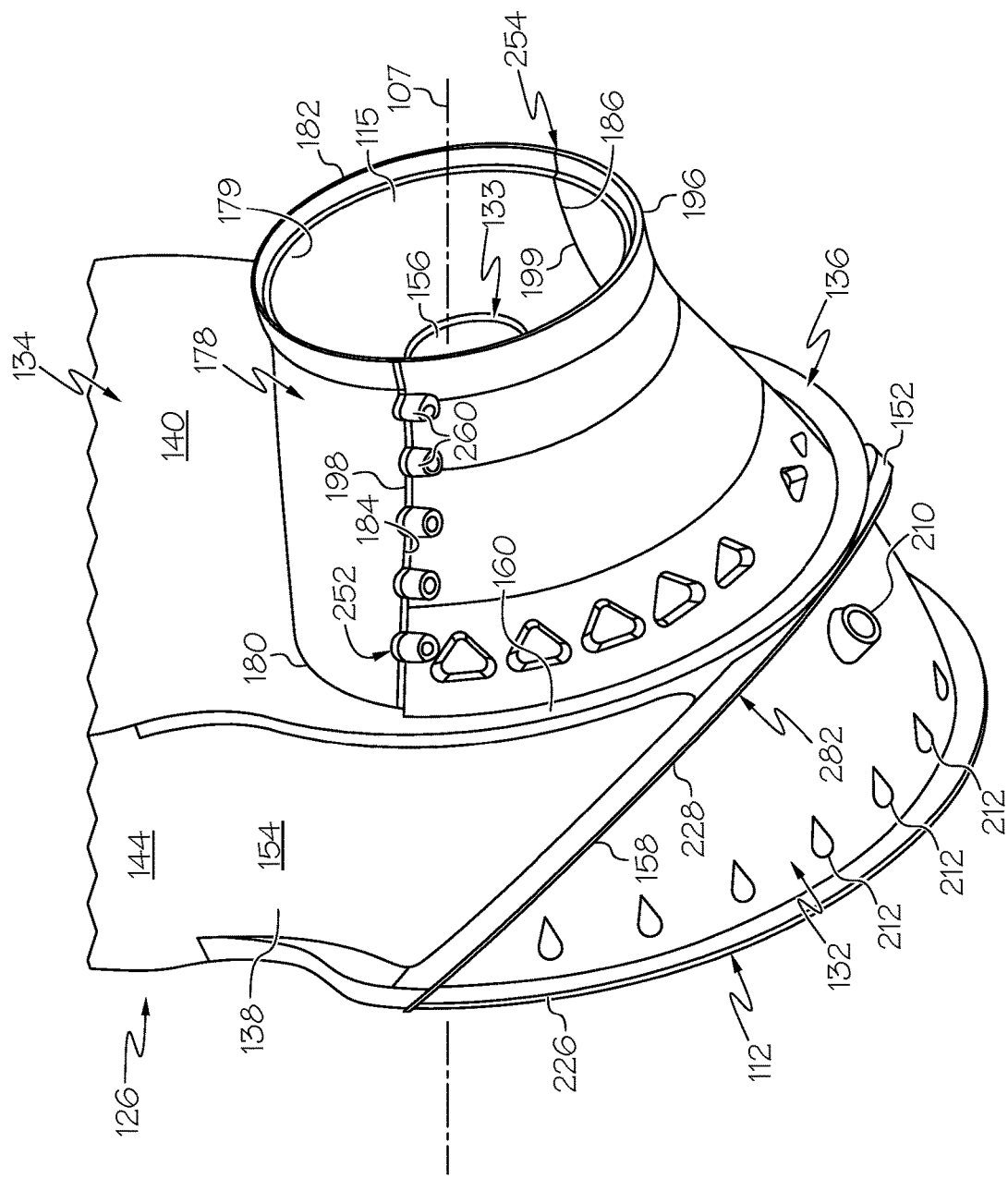
FIG. 6 is an isometric view of the air intake system of FIG. 3.

The aft portion 170 of the gearbox flow structure 146 may include a gearbox shroud member 178. The gearbox shroud member 178 may be a thin-walled arcuate member with a forward end 180 and an aft end 182 (FIGS. 4 and 6). The forward end 180 may be fixed to the aft wall 140, and the gearbox shroud member 178 may extend rearwardly along the axis 107 such that the shroud member 178 is cantilevered on the aft wall 140. The gearbox shroud member 178 may be substantially centered on the axis 107. The gearbox shroud member 178 may also include a first side edge 184 and a second side edge 186, which are disposed on opposite sides of the axis 107. The gearbox shroud member 178 may also include an underside surface 179 that is concave and that curves arcuately about the aft end of the hub 133. As shown in FIG. 4, the gearbox shroud member 178 may taper in width (radius) and may gradually narrow in the rearward direction with respect to the axis 107. The underside surface 179 of the gear may be flush with the first and second side surfaces 174, 176 so as to define a smooth surface transition therebetween.

As shown in FIGS. 3 and 4, the first side edge 184 may extend substantially parallel to the axis 107. The gearbox 126 may also include a first forward mounting surface 190. The first forward mounting surface 190 may extend forward from the first side edge 184 to the forward wall 142. In some embodiments, the first side edge 184 and the first forward mounting surface 190 may be substantially co-planar so as to lie within a horizontal plane 188 (FIG. 5). Likewise, the second side edge 186 may extend substantially parallel to the axis 107. The gearbox 126 may also include a second forward mounting surface 192. The second forward mounting surface 192 may extend forward from the second side edge 186 to the forward wall 142. In some embodiments, the second side edge 186 and the second forward mounting surface 192 may be substantially co-planar so as to lie within the horizontal plane 188.

The support arm 136 of the gearbox 126 may project downward and back from the container portion 134 of the gearbox 126. The support arm 136 may be sling-like in shape. Specifically, in some embodiments, the support arm 136 may be arcuate in shape with a first end 138 attached proximate the first forward mounting surface 190 and a second end 139 attached proximate the second forward mounting surface 192. The arm 136 may extend between the first and second ends 138, 139 and may arcuately extend about the flow axis 130. In some embodiments, the support arm 136 may be tapered. For example, the first and second ends 138, 139 may be flush with the container portion 134 of the gearbox 126, and the width of the support arm 136 may gradually taper down to a lower central region 152 of the support arm 136.

The support arm 136 may also include a forward flange 158 and a rear flange 160. The forward flange 158, 160 may be spaced apart longitudinally on upper portions of the support arm 136 and may be closely adjacent proximate the lower central region 152. The forward flange 158 may lie substantially within a first plane 162, and the rear flange 160 may lie substantially within a second plane 164 (FIG. 2).

The second plane 164 may be substantially normal to the axis 107. The first plane 162 may be disposed at an angle relative to the axis 107. Accordingly, the forward flange 158 may intersect the forward wall 142 of the container portion 134 of the gearbox 126 and may extend downward and aftward therefrom. The aft-facing surface of the rear flange 160 may be substantially co-planar and flush with the outer surface of the aft wall 140 of the gearbox 126.

Accordingly, the gearbox 126 may serve several purposes. The upper container portion 134 and the hub 133 of the gearbox 126 may contain the geartrain 110 and, in some embodiments, may contain lubricants for the geartrain 110. In addition, the gearbox flow structure 146 of the gearbox 126 may define portions of the air intake system 112 of the turboprop engine system 102. Specifically, in some embodiments, the gearbox flow structure 146 may cooperate with the inlet flow structure 132 to define the air intake system 112. The support arm 136 of the gearbox 126 may attach to and support the inlet flow structure 132. The support arm 136 may also be configured for supporting components of the engine 104 and/or other components.

In some embodiments, the engine system 102 may further include an outer support structure 128 (FIGS. 1 and 2). The outer support structure 128 may be hollow and largely cylindrical with a nonlinear longitudinal axis. A first end 214 of the outer support structure 128 may be fixedly attached to the gearbox 126. A second end 216 of the outer support structure 128 may be attached to and/or may support components of the engine 104. As such, the outer support structure 128 attaches one or more components of the engine 104 to the gearbox 126. For example, the first end 214 may include a circular flange 218 with a planar surface that faces forward. The flange 218 of the outer support structure 128 may fixedly attach to the opposing surfaces of the aft wall 140 and the rear flange 160 of the gearbox 126. This may be a fixed joint (i.e., junction, attachment, coupling, etc.) between the outer support structure 128 and the gearbox 126. For example, bolts, nuts, and/or other fasteners may be used to attach these components. As shown in FIG. 2, the second end 216 of the outer support structure 128 may support the compressor shroud 118 and/or other parts of the compressor section 114. In some embodiments, the second end 216 may also be attached to the combustor section 120 of the engine 104. Also, as shown, the outer support structure 128 may surround the gearbox shroud member 178 and aft portions of the inlet flow structure 132.

The inlet flow structure 132 will now be discussed according to example embodiments illustrated in FIG. 7. As shown, the inlet flow structure 132 of the air intake system 112 may be a panel-type body that extends arcuately about the axis 107. The inlet flow structure 132 may include an arcuate upstream edge 194 and an arcuate downstream edge 196. In some embodiments, the upstream edge 194 may include a forward flange 226 with a forward-facing surface. The inlet flow structure 132 may also include a first longitudinal edge 198 and a second longitudinal edge 199 that extend longitudinally between the upstream edge 194 to the downstream edge 196. The first and second longitudinal edges 198, 199 may be substantially co-planar in some embodiments.

As shown in FIG. 2, the inlet flow structure 132 may include an outer wall 200 and an inner wall 202. The outer wall 200 and the inner wall 202 may be layered over each other and may span substantially between the upstream edge 194, the downstream edge 196, the first longitudinal edge 198, and the second longitudinal edge 199. The outer wall 200 and the inner wall 202 may be joined and hermetically sealed together along the periphery (along the upstream edge 194, the downstream edge 196, the first longitudinal edge 198, and the second longitudinal edge 199). Central portions of the outer and inner walls 200, 202 may be spaced apart in a thickness direction to define at least one internal flow passage 204 within the inlet flow structure 132. The internal flow passage 204 may be configured to receive a flow of de-icing fluid (e.g., warm air) for de-icing the intake system 112. The inlet flow structure 132 may include one or more inlet ports 210. In the illustrated embodiment, there is a single inlet port 210 extending through the thickness of the outer wall 200 and disposed centrally thereon. The inlet flow structure 132 may also include one or more outlet apertures 212. For example, there may be a plurality of tear-shaped apertures 212 extending through the outer wall 200 and arranged proximate the upstream edge 194. Both the inlet port 210 and the outlet apertures 212 may be in fluid communication with the internal flow passage 204.

Also, the internal flow passage 204 may be defined by one or more partitions 206 that extend in the thickness direction between the outer wall 200 and the inner wall 202. The partitions 206 may separate the internal flow passage 204 into different flowpaths within the inlet flow structure 132. The partitions 206 may be disposed in a predetermined arrangement in order to provide a controlled flow of the de-icing fluid for the air intake system 112.

Figure 7:
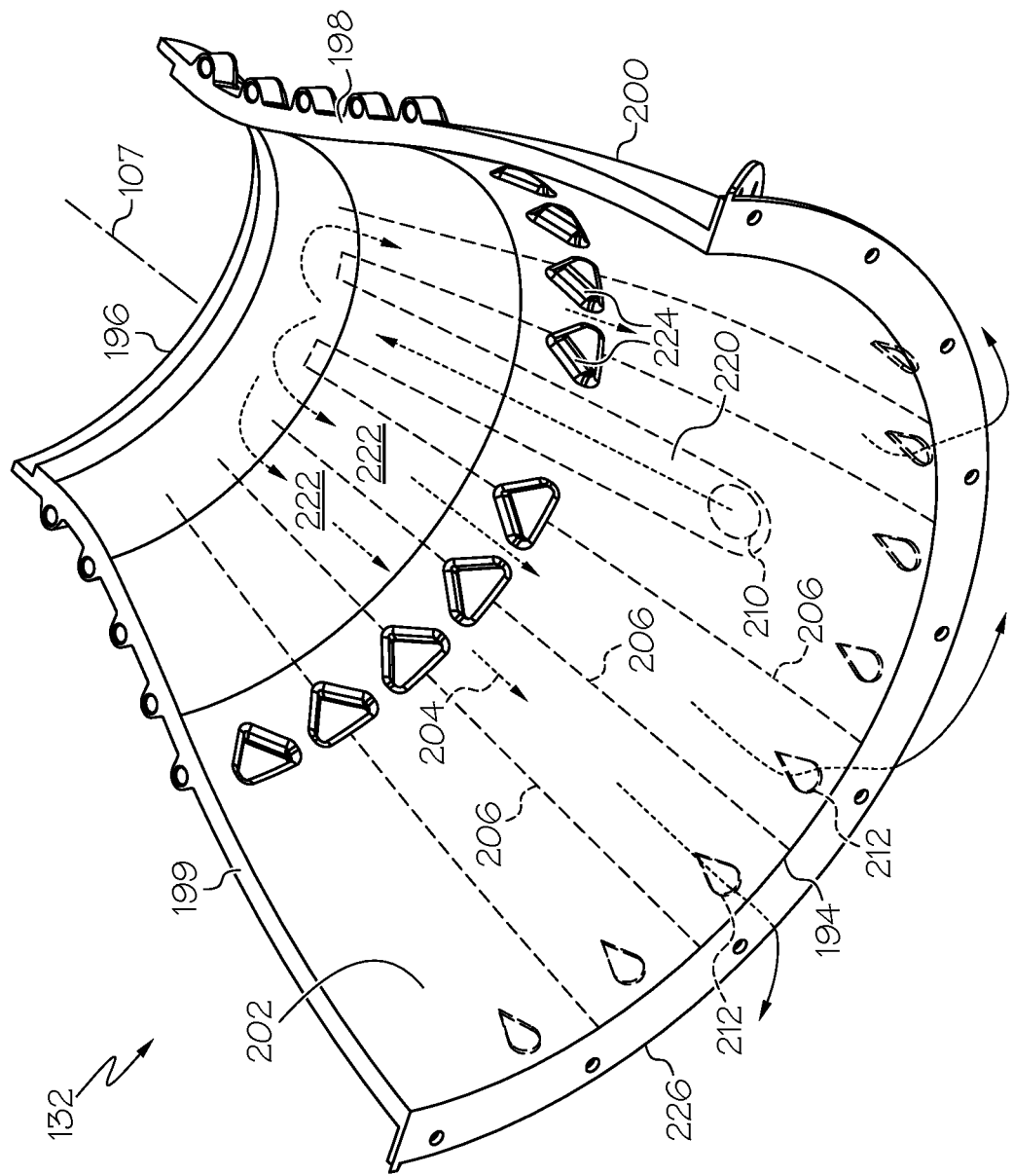
FIG. 7 is an isometric view of an inlet flow structure of the air intake system of FIG. 3.

In some embodiments, the partitions 206 may extend longitudinally between the upstream edge 194 and the downstream edge 196 as shown in FIG. 7. The partitions 206 may be arranged to direct a flow of the de-icing fluid entering the port 210 in an aftward direction along a central flow path 220. This flow may change directions and move circumferentially along the downstream edge 196. Then, the flow may be distributed along a plurality of second flow paths 222 defined between respective pairs of the partitions 206. The de-icing fluid within the second flow paths 222 may exit the flow structure 132 via a respective one of the outlet apertures 212.

The inlet flow structure 132 may also include an outer flange 228 (FIG. 3). The outer flange 228 may extend outward (e.g., normal to) the outer wall 200. The outer flange 228 may include a first end 230 and a second end 232. The first end 230 may be disposed proximate the transition between the upstream edge 194 and the first longitudinal edge 198, and the second end 232 may be disposed proximate the transition between the upstream edge 194 and the second longitudinal edge 199. The outer flange 228 may extend arcuately across the outer wall 200, and the outer flange 228 may be disposed at an angle relative to the longitudinal axis 107. For example, the outer flange 228 may include a rearward facing surface that lies in a plane that is substantially parallel to the first plane 162 (FIG. 2).

Furthermore, the inlet flow structure 132 may include a plurality of through-ports 224 in some embodiments. The through-ports 224 may be triangular through-holes that extend through the thickness of the inlet flow structure 132 (through both the outer and inner walls 200, 202). The through-ports 224 may be arranged approximately mid-way between the upstream edge 194 and the downstream edge 196 and may be spaced apart in an arcuate line between the first and second longitudinal edges 198, 199. During operation of the engine system 102, air within the inlet flow passage 113 may be ported through the ports 224 into an outer space defined between the inlet flow structure 132 and the outer support structure 128 toward the engine The inlet flow structure 132 may be attached to the gearbox 126 to cooperatively define the inlet flow passage 113. Generally, the upper surface of the inlet flow structure 132 and the underside surface of the gearbox flow structure 146 may cooperatively define the inlet flow passage 113. As shown in FIG. 5, the upstream end 111 of the inlet flow passage 113 may be arcuate (e.g., U-shaped) and discontinuous about the longitudinal axis 107. Specifically, the first side surface 174, the underside surface 172 of the hub 133, and the second side surface 176 of the gearbox 126 as well as the upstream edge 194 of the inlet flow structure 132 may cooperatively define the arcuately-shaped upstream end 111. As shown in FIG. 6, the downstream end 115 of the inlet flow passage 113 may be annular (torus-shaped) such that the downstream end 115 extends continuously about the axis 117. Specifically, the underside surface 179, the upper surface of the inlet flow structure 132, and the outer diameter surface of the hub 133 may cooperatively define the annular downstream end 115. Accordingly, the air intake system 112 may be compact and, yet, provide a relatively high mass flow for the turboprop engine system 102.

The inlet flow structure 132 may be removably attached to the gearbox 126. As such, the inlet flow structure 132 may be attached and then subsequently removed from the gearbox 126 without significant damage to one or both. Thus, the inlet flow structure 132 and/or the gearbox 126 may be advantageously re-used, replaced, repaired, and the like. The inlet flow structure 132 may be attached to the gearbox flow structure 146 of the gearbox 126 to cooperatively define the air intake system 112.

The inlet flow structure 132 and the gearbox 126 may be connected together at a variety of joints (i.e., junctions, couplings, attachments, etc.). In some embodiments, one or more of these joints may be fixed joints such that the inlet flow structure 132 and gearbox 126 are fixed together at that location. A typical fixed joint may be achieved with one or more fasteners (e.g., nuts and bolts, etc.) in some embodiments. Additionally, one or more other joints may be moveable joints (i.e., compliant, resilient, elastic, flexible joints) that are configured to allow a relatively small degree of movement between the inlet flow structure 132 and the gearbox 126. For example, opposing surfaces within the moveable joint(s) may displace relative to each other due to differences in thermal expansion, and the movable joint may allow for this displacement without imparting undue stress on surrounding structures.

For example, the inlet flow structure 132 may be received within the opening 250 of the gearbox 126 that is defined between the support arm 136 and the gearbox flow structure 146. As such, the support arm 136 and the gearbox flow structure 146 may cooperate to continuously surround the inlet flow structure 132 about the flow axis 130.

Figure 8:
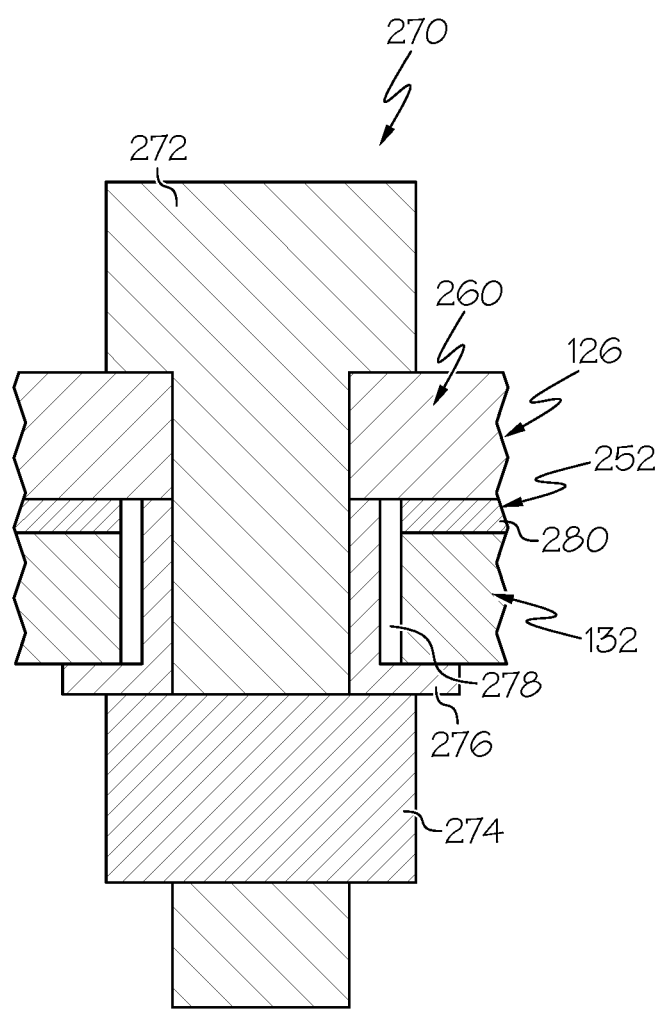
FIG. 8 is a schematic view of a moveable joint that couples the inlet flow structure and a gearbox of the engine system of FIG. 1.

Also, the first longitudinal edge 198 of the inlet flow structure 132 may be attached to the gearbox 126 at a first longitudinal joint 252. Specifically, an aft portion of the first longitudinal edge 198 may be attached to the first side edge 184 of the gearbox shroud member 178. One or more fasteners may extend through scallops 260 (FIG. 6) to establish this aft portion of the first longitudinal joint 252. For example, as shown in FIG. 8, there may be at least one moveable fastener arrangement 270 (i.e., compliant fastener, etc.). The moveable fastener arrangement 270, in some embodiments may include a bolt 272, a nut 274, and a sleeve or bushing 276 that receives the bolt 272. There may be a defined radial gap 278 between the bushing 276 and the inlet flow structure 132. The bushing 276 may also be compressed between the nut 274 and the inner surface of the gearbox 126. Moreover, the first longitudinal joint 252 may include a sealing member 280 layered between the opposing inner surfaces of the inlet flow structure 132 and the gearbox 126. The sealing member 280 may be made from an elastomeric material. As such, the moveable fastener arrangement 270 may allow a degree of movement due to differences in thermal expansion. For example, the fastener arrangement 270 may allow for sliding relative movement between the opposing inner surfaces of the structure 132 and the gearbox 126. A plurality of these moveable fastener arrangements 270 may be included along the aft portion of the first longitudinal joint 252. Furthermore, a forward portion of the first longitudinal edge 198 and the first forward mounting surface 190 of the gearbox 126 may attach together in a butt joint. There may be a sealing member layered between the first longitudinal edge 198 and the mounting surface 190 at this joint. These members may be compressed together slightly due to the fastener arrangements 270 located in the aft portion of the joint 252. Otherwise, the first longitudinal edge 198 and the first forward mounting surface 190 may remain free to slide relative to each other at this forward portion of the first longitudinal joint 252. Accordingly, the first longitudinal joint 252 may be a moveable joint (a first moveable joint).

Moreover, the second longitudinal edge 199 of the inlet flow structure 132 may be attached to the gearbox 126 at a second longitudinal joint 254. The second longitudinal joint 254 may be configured substantially similar to the first longitudinal joint 252. Thus, an aft portion of the second longitudinal edge 199 may be attached to the second side edge 186 of the gearbox shroud member 178 with a plurality of the movable fastener arrangements 270 (FIG. 8). Additionally, a forward portion of the second longitudinal edge 199 and the second forward mounting surface 192 of the gearbox 126 may attach together in a butt joint. Accordingly, the second longitudinal joint 254 may be a moveable joint between the inlet flow structure 132 and the gearbox 126 (a second moveable joint).

Additionally, the outer flange 228 of the inlet flow structure 132 may be attached to the support arm 136 of the gearbox 126 at a third joint 282. The rearward-facing surface of the outer flange 228 may be layered over the forward-facing surface of the forward flange 158 of the support arm 136. The third joint 282 may be a fixed and immobile joint. In some embodiments, traditional fasteners (e.g., nuts and bolts) may be used to fix the inlet flow structure 132 to the support arm 136 of the gearbox 126. This may be the sole (only) fixed and immobile joint between the gearbox 126 and the inlet flow structure 132 considering that the first and second longitudinal joints 252, 254 may be moveable joints as discussed above.

The inlet flow structure 132 and the gearbox 126 may be attached to other structures and may establish other joints as well. In some embodiments, at least one of these joints may be a moveable joint (i.e., compliant, resilient, elastic, flexible joint).

For example, the forward flange 226 at the upstream edge 194 of the inlet flow structure 132 may be substantially flush with the forward-facing surface of the forward wall 142 to cooperatively define the upstream end 111 of the inlet flow passage 113 (FIGS. 2 and 5). The forward flange 226 and the forward wall 142 may be attached to the first outer support structure 101 at a forward joint 290 as shown in FIG. 1. This may be a moveable joint. For example, an O-ring 292 made of elastomeric material may be included within the forward joint 290 to allow the inlet flow structure 132 and/or the gearbox 126 to move slightly relative to the outer support structure 101 (e.g., due to thermal expansion).

Likewise, the downstream edge 196 of the inlet flow structure 132 may be substantially flush with the aft end 182 of the gearbox shroud member 178 to cooperatively define the downstream end 115 of the inlet flow passage 113 (FIGS. 2 and 6). The downstream edge 196 and the aft end 182 may be attached to the compressor shroud 118 at an aft joint 294 as shown in FIG. 2. This may be a moveable joint. For example, an O-ring 296 made of elastomeric material may be included within the aft joint 294 to allow the inlet flow structure 132 and/or the gearbox 126 to move slightly relative to the compressor shroud 118 (e.g., due to thermal expansion).

Accordingly, the inlet flow structure 132 may be rigidly fixed to the gearbox 126 at the third joint 282. The other joints attaching the inlet flow structure 132 (the first and second longitudinal joints 252, 254 and the aft and forward joints 290, 294) may be moveable joints that allow a degree of movement due to thermal expansion. It is noted that the third joint 282 may be disposed longitudinally between the upstream end 111 and the downstream end 115 of the inlet flow passage 113 with respect to the flow axis 130. Also, the third joint 282 is disposed at an angle relative to the longitudinal axis 107 whereas the moveable first and second joints 252, 254 extend substantially parallel to the axis 107 and whereas the moveable aft and forward joints 290, 294 extend substantially normal to the axis 107. This arrangement allows the inlet flow structure 132 to be supported robustly in the turboprop engine system 102 while still allowing for thermal expansion. In other words, the inlet flow structure 132 may be largely thermally decoupled from the gearbox 126, the support structure 101, and/or the compressor shroud 118.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turboprop engine system for an aircraft comprising:
   an engine;
   a propeller;
   a geartrain coupled to and configured to provide power from the engine to the propeller at a predetermined gear reduction;
   a gearbox that houses at least pall of the geartrain, the gearbox including, a gearbox flow structure;
   an inlet flow structure that is removably attached to the gearbox, the inlet flow structure and the gearbox flow structure cooperating to delimit an inlet flow passage to the engine, the inlet flow passage having an upstream end with an upstream opening and a downstream end with a downstream opening; and
   the upstream opening being cooperatively delimited by both the inlet flow structure and the gearbox flow structure, the downstream opening being cooperatively delimited by the inlet flow structure and the gearbox flow structure, the upstream opening configured to receive an airstream that is directed along the inlet flow passage to the downstream opening and toward the engine.

2. The turboprop engine system of claim 1, wherein the inlet flow structure includes an edge that extends in a longitudinal direction from the upstream opening to the downstream opening; and
   wherein the inlet flow structure is removably attached to the gearbox at the edge.

3. The turboprop engine system of claim 1, wherein the inlet flow passage extends along a longitudinal axis of the engine system; wherein the upstream opening is arcuate and partially surrounds the axis; and wherein the downstream opening is annular and continuous about the axis.

4. The turboprop engine system of claim 1, wherein the gearbox includes a support arm that extends at least partially about the inlet flow structure; and
   wherein the inlet flow structure is attached to the support arm.

5. The turboprop engine system of claim 4, wherein the gearbox flow structure and the support arm cooperate to continuously surround the inlet flow structure.

6. The turboprop engine system of claim 4, further comprising an outer support structure that attaches the engine to the gearbox; and
   wherein the outer support structure is attached to the support arm.

7. The turboprop engine system of claim 4, wherein the support arm and the inlet flow structure are fixedly attached together at a fixed joint; and
   further comprising at least one moveable joint that supports the inlet flow structure on the turboprop engine system.

8. The turboprop engine system of claim 7, wherein the inlet flow passage extends along a flow axis; wherein the fixed joint is disposed between the upstream opening and the downstream opening with respect to the flow axis.

9. The turboprop engine system of claim 8, wherein the engine includes a rotating group that is supported for rotation about an axis;
   wherein the fixed joint is disposed substantially within a first plane;
   wherein the upstream end is disposed substantially within a second plane;
   wherein the downstream end is disposed substantially within a third plane;
   wherein the first plane is disposed at an angle relative to the axis of rotation; and
   wherein the second plane and the third plane are substantially normal to the axis of rotation.

10. The turboprop engine system of claim 7, wherein the inlet flow structure includes an edge that extends in a longitudinal direction from the upstream opening to the downstream opening;
    wherein the inlet flow structure is removably attached to the gearbox at the edge; and
    wherein the at least one moveable joint includes a first moveable joint at the edge.

11. The turboprop engine system of claim 7, further comprising a first outer support structure that supports the gearbox and the inlet flow structure at the upstream end;
    wherein the at least one moveable joint includes a second moveable joint between the first outer support structure and the inlet flow structure.

12. The turboprop engine system of claim 7, further comprising an impeller and a compressor shroud that are disposed proximate the downstream end; and
    wherein the at least one moveable joint includes a third moveable joint between the downstream end and the compressor shroud.

13. The turboprop engine system of claim 1, wherein the inlet flow structure includes a first wall, a second wall, and an internal flow passage that is defined between the first wall and the second wall, the internal flow passage configured to receive a de-icing fluid flow.

14. The turboprop engine system of claim 13, further comprising a partition that extends between the first wall and the second wall; and
   wherein the partition separates the internal flow passage into a first flowpath and a second flowpath.

15. The turboprop engine system of claim 13, wherein the internal flow passage includes an inlet and an outlet;
   wherein the internal flow passage extends through the inlet flow structure, from the inlet in an aftward direction and turns forward toward the outlet.

16. The turboprop engine system of claim 1, wherein the engine includes a rotating group that is supported for rotation about a first axis;
   wherein the propeller is supported for rotation about a second axis;
   wherein the first axis and the second axis are substantially parallel and spaced apart at a distance.

17. A method of manufacturing a turboprop engine system comprising:
   removably attaching an inlet flow structure to a gearbox, the gearbox configured to house at least part of a geartrain that provides power from an engine to a propeller at a predetermined gear reduction, the gearbox including a gearbox flow structure;
   the inlet flow structure and the gearbox flow structure, when removably attached, cooperating together to delimit an inlet flow passage to the engine, the inlet flow passage having an upstream end with an upstream opening and a downstream end with a downstream opening, the upstream opening being cooperatively delimited by both the inlet flow structure and the gearbox flow structure, the downstream opening being cooperatively defined by the inlet flow structure and the gearbox flow structure, the upstream opening configured to receive an airstream that is directed along the inlet flow passage to the downstream opening and toward the engine.

18. The method of claim 17, wherein removably attaching the inlet flow structure to the gearbox includes:
   attaching the inlet flow structure to the gearbox at a first joint that is substantially fixed; and
   attaching the inlet flow structure to the gearbox at a second joint that is moveable.

19. The method of claim 17, further comprising attaching the inlet flow structure and the gearbox to another structure at a third joint; and
   wherein the third joint is moveable.

* * * * *